（12）United States Patent
Maxwell, III (10) Patent No.: US 7,171,403 B2
(45) Date of Patent: Jan. 30, 2007

(54) SYSTEMS AND METHODS FOR EFFICIENT CONJUNCTION OF BOOLEAN VARIABLES (75) Inventor: John T. Maxwell, III, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 713 days.

(21) Appl. No.: 10/338,846

(22) Filed: Jan. 9, 2003

(65) Prior Publication Data

US 2004/0139060 A1     Jul. 15, 2004

(51) Int. Cl.
G06F 7/00    (2006.01)
G06F 17/30   (2006.01)

(52) U.S. Cl. ............................... 707/3; 707/1; 707/101
(58) Field of Classification Search ................ 707/3, 707/4, 5, 1, 101; 704/9
See application file for complete search history.

(56) References Cited

U.S. PATENT DOCUMENTS

| 5,438,511 A | 8/1995 | Maxwell, III et al. |
| 5,450,598 A | 9/1995 | Kaplan et al. |
| 5,727,222 A | 3/1998 | Maxwell, III |

(Continued)

FOREIGN PATENT DOCUMENTS

EP          1 109 110 A1      6/2001

OTHER PUBLICATIONS

John T. Maxwell III et al., "The interface between Phrasal and Functional Constraints" in Computational Linguistics, vol. 19: No. 4, 1994.

(Continued)

Primary Examiner—Apu M. Mofiz
Assistant Examiner—Michael J. Hicks
(74) Attorney, Agent, or Firm—Christian Austin-Hollands (57) ABSTRACT Techniques are provided for determining the efficient conjunction of Boolean variables drawn from an and-or forest of choices. The techniques determine two contexts to conjoin, where the contexts consist of choices drawn from an and-or forest of choices. The choices in the first context are marked with a first mark, along with all of their antecedent choices. The choices in the second context are marked with a second mark, along with all of their antecedent choices. The techniques determine and-nodes in the and-or forest having the first mark from a first dependent or-node and the second mark from a second dependent node. The dependent or-nodes are refined and then partitioned into classes based on the presence of the first mark and the second mark, the first mark only, the second mark only, and neither mark. A cross-product of the partitions for each node is determined and the resultant combinations are grouped based on the presence of both the first and second marks, the presence of the first mark only, the presence of the second mark only and presence of neither mark. A new or-node having choices reflecting the combinations having both marks, the first mark only, the second mark only and neither mark is determined. The new or-node represents a transformed and-or forest of choices that is in free-choice form. The first and second nodes in the forest of choices are replaced with an or-node having choices based on the first and second mark. The conjunction of contexts is then determined based on the choice having both the first and second marks.

19 Claims, 8 Drawing Sheets

U.S. PATENT DOCUMENTS

| | | | |
|---|---|---|---|
| 5,819,210 A | | 10/1998 | Maxwell, III et al. |
| 5,903,860 A | | 5/1999 | Maxwell, III et al. |
| 6,009,199 A | * | 12/1999 | Ho ............................. 382/224 |
| 6,064,953 A | | 5/2000 | Maxwell, III et al. |
| 6,405,190 B1 | * | 6/2002 | Conklin ........................ 707/3 |
| 2005/0137855 A1 | * | 6/2005 | Maxwell, III .................. 704/9 |

OTHER PUBLICATIONS

Stuart Geman et al., "Dynamic Programming for Parsing and Estimation of Stochastic Unification-Based Grammars" in Proceedings of the 40th Annual Meeting of the Association for Computational Linguistics, 2002.

* cited by examiner

I saw the green light on the hill with the telescope

J'ai vu la lumière verte sur la colline avec le telescope

| 1 | TRUE → I(1) | |
| --- | --- | --- |
| 2 | p1 → see(0,1,2) past(0) | |
| 3 | p2 → saw(0,1,2) pres(0) | "cut with saw" |
| 4 | TRUE → the(2) | |
| 5 | q1 → green1(2) | "green as an adjective" |
| 6 | q2 → green2(2) | "green as a noun" |
| 7 | TRUE → light(2) | |
| 8 | TRUE → on(3,4) | |
| 9 | TRUE → the(4) | |
| 10 | TRUE → hill(4) | |
| 11 | r1 → mod(3,0) | "on modifies saw" |
| 12 | r2 → mod(3,2) | "on modifies light" |
| 13 | TRUE → with(5,6) | |
| 14 | TRUE → the(6) | |
| 15 | TRUE → telescope(6) | |
| 16 | s1 V t1 → mod(5,0) | "with modifies saw" |
| 17 | s2 V t2 → mod(5,4) | "with modifies light" |
| 18 | t3 → mod(5,2) | "with modifies hill" |

Fig. 11

| a1 | ↔ | oneof(...) | P WITH BOTH MARKS |
| a2 | ↔ | oneof(...) | P WITH FIRST MARK |
| a3 | ↔ | oneof(...) | P WITH SECOND MARK |
| a4 | ↔ | oneof(...) | P WITH NEITHER MARK |
| b1 | ↔ | oneof(...) | Q WITH BOTH MARKS |
| b2 | ↔ | oneof(...) | Q WITH FIRST MARK |
| b3 | ↔ | oneof(...) | Q WITH SECOND MARK |
| b4 | ↔ | oneof(...) | Q WITH NEITHER MARK |

Fig. 12

| x1 | ↔ | oneof(a1b1,a1b2,a1b3,a1b4,a2b1,a2b3,a3b1,a3b2,a4b1) |
|---|---|---|
| x2 | ↔ | oneof(a2b2,a2b4,a4b2) |
| x3 | ↔ | oneof(a3b3,a3b4,a4b3) |
| x4 | ↔ | oneof(a4b4) |

Fig. 13

| a1b1 ∨ a1b2 ∨ a1b3 ∨ a1b4 | ↔ | oneof(...) | P WITH BOTH MARKS |
| a2b1 ∨ a2b2 ∨ a2b3 ∨ a2b4 | ↔ | oneof(...) | P WITH FIRST MARK |
| a3b1 ∨ a3b2 ∨ a3b3 ∨ a3b4 | ↔ | oneof(...) | P WITH SECOND MARK |
| a4b1 ∨ a4b2 ∨ a4b3 ∨ a4b4 | ↔ | oneof(...) | P WITH NEITHER MARK |
| a1b1 ∨ a2b1 ∨ a3b1 ∨ a4b1 | ↔ | oneof(...) | Q WITH BOTH MARKS |
| a1b2 ∨ a2b2 ∨ a3b2 ∨ a4b2 | ↔ | oneof(...) | Q WITH FIRST MARK |
| a1b3 ∨ a2b3 ∨ a3b3 ∨ a4b3 | ↔ | oneof(...) | Q WITH SECOND MARK |
| a1b4 ∨ a2b4 ∨ a3b4 ∨ a4b4 | ↔ | oneof(...) | Q WITH NEITHER MARK |

Fig. 14

SYSTEMS AND METHODS FOR EFFICIENT CONJUNCTION OF BOOLEAN VARIABLES

INCORPORATION BY REFERENCE

This Application incorporates by reference:
Maxwell et al., U.S. Pat. No. 6,064,953, entitled "Method for Creating a Disjunctive Edge Graph From Subtrees During Unification", issued May 16, 2000;
Maxwell et al., U.S. Pat. No. 5,903,860, entitled "Method of Conjoining Clauses During Unification Using Opaque Clauses", issued May 11, 1999;
Maxwell et al., U.S. Pat. No. 5,819,210, entitled "Method of Lazy Contexted Copying During Unification", issued Oct. 6, 1998;
Maxwell, III, U.S. Pat. No. 5,727,222, entitled "Method of Parsing Unification Based Grammars Using Disjunctive Lazy Copy Links", Mar. 10, 1998;
Kaplan et al., U.S. Pat. No. 5,450,598, entitled "Finite State Machine Data Storage Where Data Transition is Accomplished Without the Use of Pointers", issued Sep. 12, 1995;
Maxwell et al., U.S. Pat. No. 5,438,511, entitled "Disjunctive Unification", issued Aug. 1, 1995;
each, in their entirety.

REFERENCE TO COMPUTER PROGRAM LISTING APPENDIX

This application includes a computer program appendix listing (in compliance with 37 C.F.R § 1.96) containing source code for one embodiment. The computer program appendix listing is submitted herewith on one original and one duplicate compact disk (in compliance with 37 C.F.R § 1.52(e)) designated respectively as Copy 1 and Copy 2 and labeled in compliance with 37 C.F.R § 1.52(e)(6).

All the material in this computer program appendix listing on compact disk is hereby incorporated by reference, and identified by the following table of filenames, creation date and size in bytes:

| FILENAME | CREATION DATE | SIZE |
| --- | --- | --- |
| clause-chart.c | Dec. 9, 2002 | 68K |

A portion of the disclosure of this patent document contains material which is subject to copyright protection. The copyright owner has no objection to the facsimile reproduction by any one of the patent document disclosure or the patent disclosure, as it appears in the Patent and Trademark Office patent file or records, but otherwise reserves all copyright rights whatsoever.

1. Field of Invention

This invention relates to the efficient conjunction of Boolean variables.

2. Description of Related Art

Various conventional systems attempt to represent the ambiguity in natural language. However, most conventional systems of representing ambiguity do not provide for applying linguistic transformations directly to the packed representation of meaning. Instead, these conventional systems require unpacking the packed representation of meaning into an intermediate form that can be further transformed. Thus, considerable time is wasted in transforming between packed representations of meanings and other representations.

Dymetman et al., European Patent Application EP 1109110, proposes a conventional system for applying linguistic transformations directly to a packed representation of meaning. The Dymetman system embeds linguistic facts in a special data structure that represents the ambiguity of a sentence. However, the Dymetman system has at least two disadvantages. Firstly, linguistic facts are embedded in a special data structure. Therefore, any system that operates on the facts must also understand how to manipulate the special data structure. This reduces modularity. The second disadvantage is that the special data structure may require the same linguistic fact to appear in many different places. This increases the time that it takes to find and operate on specific facts within the special data structure.

Other conventional systems such as the Xerox XLE environment use a different system for representing linguistic ambiguity which avoids these problems. The XLE's packed representation used in the Xerox XLE environment is a list of contexted facts of the form Ci→Fi, where Ci is a context and Fi is a linguistic fact. A context is typically a set of choices drawn from an and-or forest that represents the ambiguity of a sentence. Each linguistic fact appears exactly once in the list, which reduces the time that it takes to find and operate on facts of interest. Since the basic data structure of the packed representation of meaning can be implemented as a list, other conventional systems can easily operate on the packed representation of meaning data structure, thereby improving modularity. However, this packed representation of meaning data structure does not perform well in systems that operate on two or more linguistic facts as a unit.

To operate on two facts as a unit, the context of the combination of the facts must be determined by conjoining the contexts associated with each individual fact. For example, a conventional method of conjoining two contexts would take the cross product of the two contexts to produce an and-or forest of choices. Thus, for contexts C1=C11 V C12 ... C1m and C2=C21 V C22 ... C2n, a cross-product (C11&C21) V (C11&C22)V ... (C1m&C2n) is formed in order O(M*N) time. The original and-or forest remains unchanged.

For long sentences, the time to perform a cross product can be quite large. Moreover, the original and-or forest is no longer completely free. This is because some facts have contexts which contain conjunctions of choices. These facts are only enabled when both of the choices are chosen. This affects the statistical independence of the choices. Since many existing natural language algorithms depend on the statistical independence of the nodes, maintaining the free-choice or statistical independence of the and-or forest of choices is important. For example, in various conventional systems, the probabilistic determination of meaning requires that the or-nodes of the and-or forest of choices be in free-choice form. Thus, conventional systems and methods of determining a conjunction of Boolean variables are limited in the size of the combinations that can be performed and the speed with which a conjunction can be determined.

SUMMARY OF THE INVENTION

The systems and methods of this invention provide for the determination of conjunctions of Boolean variables that keeps the and-or forest of choices in free-choice form. Systems and methods according to this invention determine conjunctions of M choices by N choices in order O(M+N+ 16) time. The systems and methods of this invention facilitate the use of standardized packed representations in linguistic transformations that do not require unpacking the representations for further processing. Thus, these systems and methods also provide a framework for structured development of language processing tools. The systems and methods of this invention determine an and-or forest of choices for at least two or-nodes. Choices in a first context and associated antecedent choices are marked with a first mark. Choices in a second context and associated antecedent choices are marked with a second mark. And-nodes in the and-or forest of choices having a first mark based on a dependent or-node, and a second mark based on a different or-node are determined. For each determined and-node, the choices of the dependent or-nodes are partitioned into classes based on the first and second marks. A cross-product of the partition of or-node choices is determined and grouped based on the first mark and the second mark. A new or-node having a choice for each class of cross-product combination is determined and replaces the or-nodes depending from each determined and-node. A new context is determined based on the new node choices having both marks.

DETAILED DESCRIPTION OF EXEMPLARY EMBODIMENTS

Figure 1:
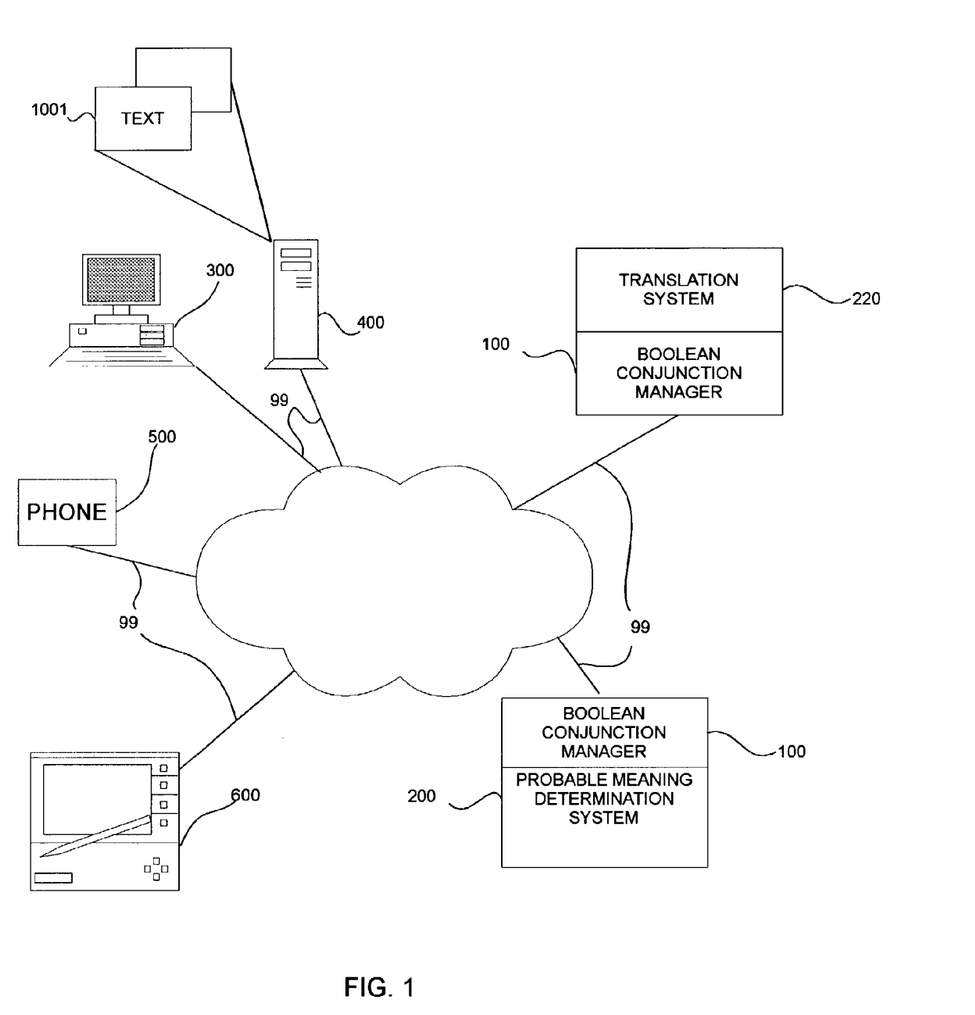
FIG. 1 is an overview showing an exemplary Boolean conjunction manager according to this invention.

FIG. 1 is an overview showing an exemplary Boolean conjunction manager according to this invention. A web-enabled portable device 600, a phone 500, an information repository 400, a web-enabled personal computer 300 are connected via communications links to 99 to a probable meaning determination system 200 and translation system 220. The probable meaning determination system 200 and the translation systems 220 each contain an exemplary Boolean variable conjunction manager 100.

The information repository 400 may include, but is not limited to a web server serving HTML and or WML files, a digital library providing access to documents in Microsoft Word, Adobe PDF, extensible markup language, electronic book format or any known or later developed method of providing access to information.

In a first exemplary embodiment according to this invention, a user of the web-enabled personal computer 300 initiates a natural language query for information related to a "proxy fight for PDZ Corporation". The natural language query is sent to information repository 400 over communications links 99. In various exemplary embodiments according to this invention, the information repository 400 may use a probable meaning determination to refine the query for relevant material.

For example, based on the probable meaning determination, a natural language concept query may be determined. The exemplary natural language concept query may include related concepts based on Wordnet associations or other known or later developed determinations of related concepts. In this way, both the precision and scope of the query results can be improved. In order to determine the probable meaning of the natural language query, the information repository 400 forwards the natural language query to the probable meaning determination system 200.

The probable meaning determination system 200 determines a packed representation of the natural language query and forwards the packed representation to the Boolean variable conjunction manager 100. The Boolean variable conjunction manager 100 determines the transformed and-or forest of choices for the combined context in a free choice form. The transformed and-or forest is then returned to the probable meaning determination system 200 where the probable meaning is determined based on the received transformed and-or forest of choices.

The Boolean variable conjunction manager 100 preserves a free-choice form of the and-or forest of choices. Therefore, conventional statistical determinations of probable meaning may also be used while benefiting from the compact representation and the reduced computations of this invention. However, it will be apparent that other transformations such as language translation, information retrieval or any known or later developed linguistic transformation may also use the Boolean conjunction manager to facilitate linguistic processing without departing from the scope of this invention.

Once the probable meaning of the sentence is determined, the probable meaning is returned to the information repository 400 via communication links 99. The information repository 400 then determines a query based on the probable meaning. For example, the probable meaning concepts "legal representative, corporate control, corporate ownership and PDZ Corporation" may be used to determine a relevant concept query. The relevant documents 1001 are retrieved by the information repository 400 and forwarded via communications links 99 to the user of web-enabled computer 300.

In a second exemplary embodiment according to this invention, the user of telephone 500 requests the retrieval of a document from information repository 400 using a speech query. In various exemplary embodiments of this invention, the information repository responds to voice XML, VML or other voice based queries for information. The recognized voice query is forwarded by the information repository 400 to a probable meaning determination system 200.

The probable meaning determination system 200, determines a packed representation of the received voice query and forwards the packed representation to the Boolean conjunction manager 100. A transformed and-or forest of choices in free choice form is then determined and returned to the probable meaning determination system 200. The probable meaning system 200 determines the probable meaning associated with the voice query and forwards the probable meaning to information repository 400. Based on the determined probable meaning information, the information repository retrieves and forwards the requested document via communications links 99 to a voice synthesizer (not shown) within phone 500.

In a third exemplary embodiment according to this invention, the user of portable web-enabled device 600 initiates a request for the translation of a sentence, a document, a query or any other source of natural language information. The translation request is then forwarded via communications links 99 to a translation system 220 containing a Boolean conjunction manager 100.

The translation system 220 determines a packed representation of the translation request. The packed representation is then forwarded to the Boolean conjunction manager 100 where the context for the conjunctions is determined. A transformed and-or forest of choices in free-choice form is determined and returned to the translation system 220.

The translation system 220 then performs the translation of the natural language source based on the context information provided by the Boolean conjunction manager 100. The completed translation is then returned to the user of web-enabled device 600 via communication links 99.

It will be apparent that the Boolean conjunction manager 100 may be used in systems for transforming linguistic elements, truth management systems, constraint propagation systems or any known or later developed system that requires the determination of Boolean conjunctions, without departing from the scope of this invention.

Figure 2:
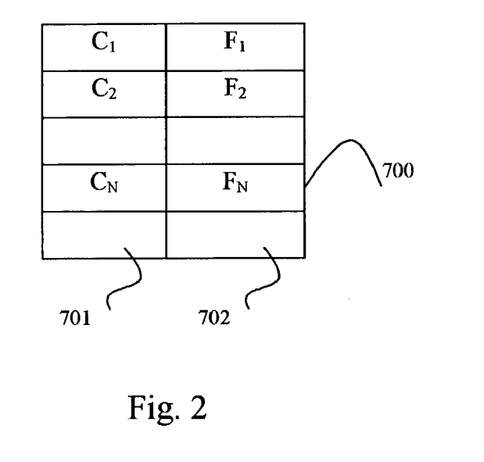
FIG. 2 is an exemplary general form of a packed representation of meaning.

FIG. 2 is an exemplary general form of a packed representation of meaning. The exemplary general form of a packed representation has Boolean contexts C1 ... CN in the left hand column and facts F1 ... FN in the right hand column. The fact Fi is valid when the context $C_i$ is true. The Boolean contexts are disjunctions of Boolean variables drawn from an and-or forest of choices. An and-or forest of choices is typically shown using the expression:

$$C \Leftrightarrow oneof(k_1, k_2, k_3)$$

Where the right hand side is an or-node in the forest of choices and each choice occurs in only one or-node. The context associated with the or-node can be TRUE, such as a root node, a single choice or a set of choices. If it is a set of choices, the choices are disjoint choices. A choice is an and-node if it occurs in the context of more than one or-node. The or-nodes are dependent on the and-node.

Solutions are enumerated starting with TRUE at the root node and selecting choices from the dependent or-nodes. The resultant set of Boolean variables form a valid solution as to the meaning of the sentence. Thus, the set of Boolean variables can be used to extract an and-or forest of choices from the packed representation. If there is no interaction among the facts extracted, the and-or forest is said to be in free-choice form. As discussed above, maintaining the free-choice form facilitates further processing which depends on the statistical independence of the choices.

Figure 3:
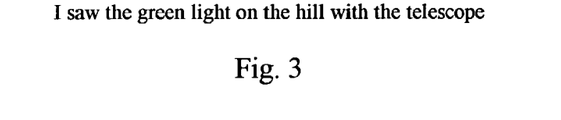
FIG. 3 is a first exemplary sentence to be analyzed.

FIG. 3 is a first exemplary sentence to be analyzed. The sentence contains linguistic ambiguity. For example, one reading of the sentence describes a green light on a hill, the hill also having a telescope on it. However, an alternative reading of the sentence describes the a green light which was seen on the hill with the assistance of a telescope. Both readings of sentence may be efficiently encoded in a packed representation of meaning.

Figure 4:
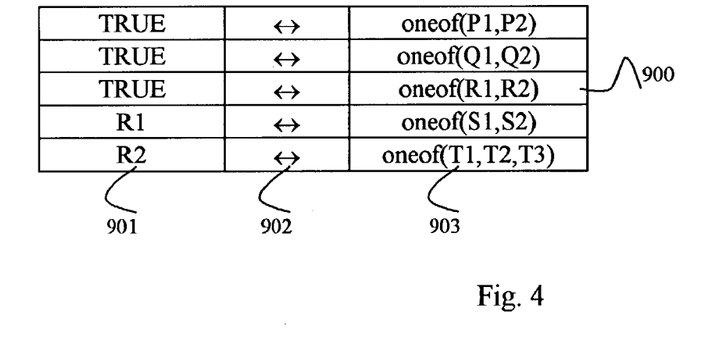
FIG. 4 is an exemplary data structure for storing a forest of choices associated with the exemplary output of a linguistic environment.

FIG. 4 shows an exemplary data structure for storing a forest of choices 900 associated with the output of an exemplary linguistic environment. The forest of choices 900 comprises a context portion 901, a relational operator 902 and a choice portion 903.

The context portion 901 of the first row of the exemplary data structure for storing an and-or forest of choices 900 contains a "TRUE" value indicating the choices related by relational operator portion 902 are valid for all contexts. The value "oneof(P1,P2)" in the choice portion 903 indicates that or-node choices P1 and P2 are valid in the TRUE context. Similarly, the second row of the exemplary data structure for storing a forest of choices 900 also has a "TRUE" value in the context portion 901 and "oneof(Q1, Q2)" in the choice portion 903 indicating an or-node with choices Q1 and Q2. The third row of the exemplary data structure for storing a forest of choices 900 has a "TRUE" value in the context portion 901 and "oneof(R1,R2)" in the choice portion 903 indicating an or-node with choices R1 and R2.

The fourth row of the exemplary data structure for storing an and-or forest of choices contains a context portion 901 with a value "R1" and a choice portion containing an or-node containing the value "oneof(S1, S2)". The value of the context portion 901 indicates that the or-node is in turn a sub-node associated with the node in row 3. The context portion 101 could also contain a set of disjoint choices, which is why this structure represents an and-or forest instead of an and-or tree.

Transformations such as language translations may be applied to the extracted and-or forest of choices. However, without the associated context information some transformations may not perform consistently. For example, if the context information is ignored, the translation of the English portion of the sentence "green1(2) light(2)" might be mistranslated into French as "feu(2) vert(2)" instead of "lumière(2) verte(2)".

Figure 5:
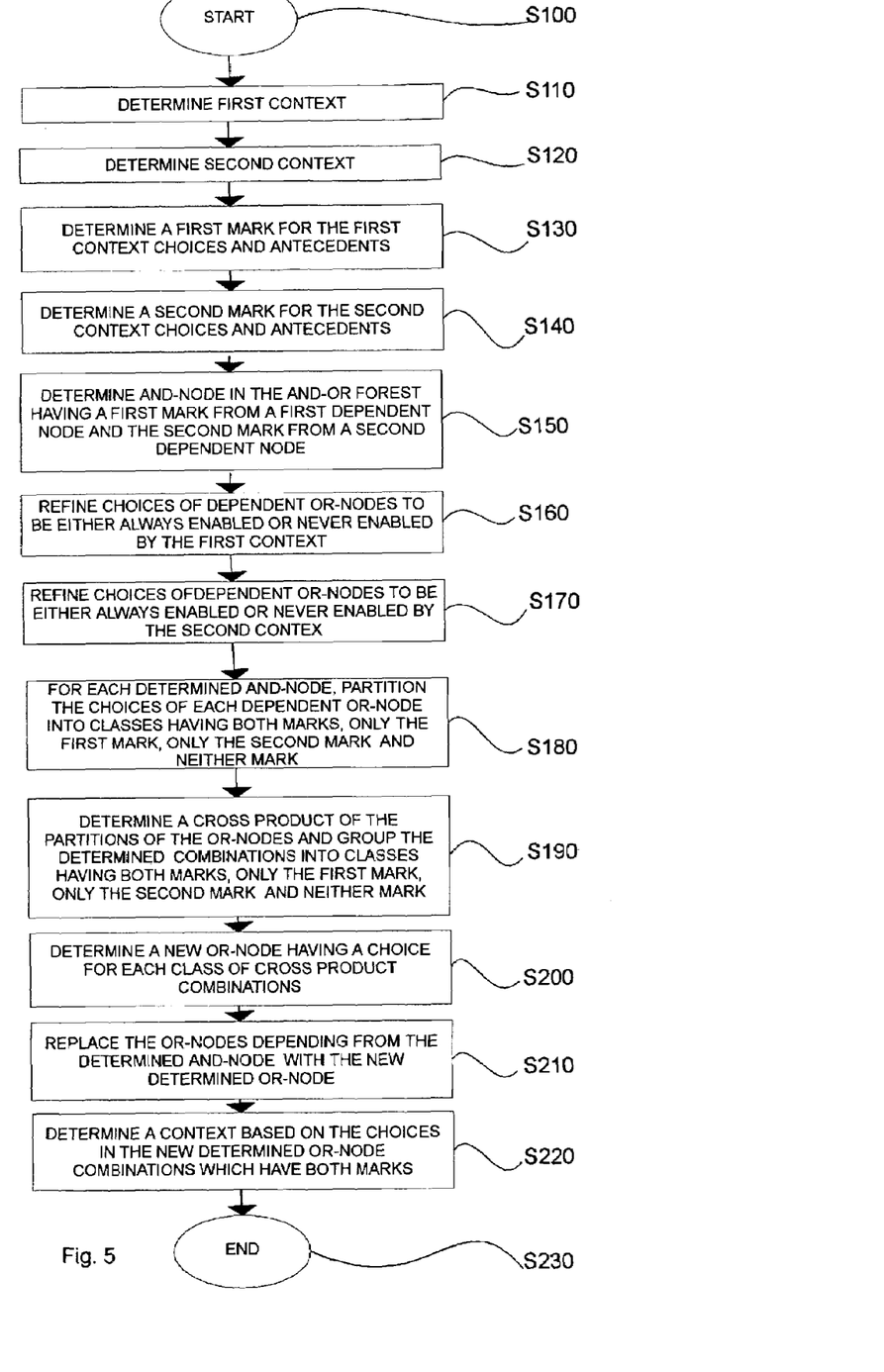
FIG. 5 is a flowchart of an exemplary method of Boolean conjunction determination according to this invention.

FIG. 5 is a flowchart of an exemplary method of Boolean conjunction determination according to this invention. The process begins at step S100 and immediately continues to step S110.

In step S110, a first context is determined. The first context may be associated with a meaning in a sentence. For example, in various exemplary packed representations, a context associated with a meaning is encoded in the left hand side of a meaning expression. The meaning or fact is then encoded in the right hand side of the meaning expression. An exemplary packed representation of meaning efficiently encodes ambiguities using or-nodes in the and-or forest of choices. However, it will be apparent that any known or later developed method of storing meaning and determining the first context may also be used in the practice of this invention. Once the first context has been determined, control continues to step S120.

A second context is determined in step S120. For example, in various exemplary embodiments of this invention, the second context may be determined from the left hand or context portion of the packed representation of meaning expression. However, any known or later developed method of storing meaning and determining the second context may be used in the practice of this invention. Control then continues to step S130.

In step S 130, all of the choices in the first context are marked with a first mark. Furthermore, if any choice that has a first mark belongs to an or-node that has a context other than the TRUE context, then all of the choices in the context of the or-node are also marked with the first mark. This continues until there are no more choices to be marked. Control continues to step S140.

All of the choices in the second context are marked with a second mark in step S140. Furthermore, if any choice that has a second mark belongs to an or-node that has a context other than the TRUE context, then all of the choices in the context of the or-node are also marked with the second mark. This continues until there are no more choices to be marked. Control continues to step S150.

In step S150, and-nodes from the and-or forest are determined which receive the first mark from one dependent or-node and the second mark from a different dependent or-node. In various exemplary embodiments according to this invention, the and-nodes can be found by searching the and-or forest from the root node and following nodes that have both marks. In still other exemplary embodiments of this invention, the and-nodes having both marks may be recorded as they are encountered in step 140. However, it will be apparent that any known or later developed method of determining and-nodes having both marks based on different dependent or-nodes may also be used in the practice of this invention. Control continues to step S160.

In step S160, the dependent or-nodes are refined so that each choice is either always enabled or never enabled by the first context. A choice is always enabled by the first context if it is either a member of the first context or it is a member of the context of an or-node all of whose choices are always enabled by the first context. It will be apparent that the always-enabled and the never-enabled property associated with the choices can be computed as needed and cached, computed during step S130 and cached or determined using any known or later developed method without departing from the scope of this invention. If a choice in a dependent or-node is marked with the first mark but is not always enabled by the first context, then the choice's dependent or-nodes are recursively refined so that the choices are either, always enabled by the first context or never enabled by the first context. The dependent or-node is then split into two or-nodes, one of the dependent or-nodes having choices that are always enabled by the first context and the other dependent or-node having choices that are never enabled by the first context. The current choice is then replaced with two new choices. The first new choice has the first or-node as a dependent and the second new choice has the second or-node as a dependent. The current choice is made a dependent of the two new choices.

In step S170, the dependent or-nodes are refined so that each choice is either always enabled or never enabled by the second context. A choice is always enabled by the second context if it is either a member of the second context or it is a member of the context of an or-node all of whose choices are always enabled by the second context. It will be apparent that the always-enabled and the never-enabled property associated with the choices can be computed as needed and cached, computed during step S140 and cached or determined using any known or later developed method without departing from the scope of this invention. If a choice in a dependent or-node is marked with the second mark but is not always enabled by the second context, then the choice's dependent or-nodes are recursively refined so that the choices are either always enabled by the second context or never enabled by the second context. The dependent or-node is then split into two or-nodes, one of which has choices that are always enabled by the second context and the other of which has choices that are never enabled by the second context. Then the current choice is replaced with two choices, one of which has the second or-node as a dependent and the other of which has the first or-node. The current choice is made a dependent of the two new choices.

Each or-node depending from the determined and-nodes is partitioned into four possible classes in step S180. The class partitions are based on the choices having both marks, the choices having just the first mark, the choices having just the second mark, and the choices having neither marks. At this point, choices with the first mark are always enabled by the first context because of step S160. Also, choices with the second mark are always enabled by the second context because of step S170.

In step S190, a cross-product of the partitions is determined, and the combinations are grouped into four possible classes. A first class is comprised of the combinations in the cross-product that have both the first and the second mark. The second class is comprised of the combinations that have just the first mark. The third class is comprised of the combinations that have just the second mark. The fourth class is comprised of the combinations that have neither mark. If there are more than two dependent or-nodes with marks, steps S160 through S210 are successively applied to the first pair of dependent or-nodes until only two or-nodes with marks remain.

For example, the combinations may be sorted to group the combinations based on the first and second mark combinations. However, in various other exemplary embodiments according to this invention, any other known or later developed method of grouping the combinations based on the mark combinations may also be used. After determining the cross product of the partitions and grouping the results based on the first and second marks, control continues to step S200.

In step S200, a new or-node is determined. The new or-node has a choice for each class of combinations. For example, an X1 choice in the new or-node is created and associated with each combination that has both a first and second mark. A new X2 choice is created in the new or-node and associated with each combination that has only the first mark and no second mark. A new X3 choice is created in the new or-node and associated with each combination that has only the second mark and no first mark. A new X4 choice is created in the new or-node and associated with each combination that has neither the first mark nor the second mark. Control continues to step S210.

In step S210, the dependent or-nodes of the determined and-node are replaced with the new determined or-node. For example, if the nodes are stored in a graph oriented data structure, then any known or later developed method for replacing nodes in a graph oriented data structure may be used in the practice of this invention. However, in various embodiments of this invention, nodes may also be stored in lists, arrays, matrices and/or any known or later developed storage structure capable of storing node information. Thus, it will be apparent that any known or later developed method of replacing nodes in the relevant node data structure may also be used in the practice of this invention. After the dependent or-nodes are replaced, control continues to step S220.

In step S220, a context is created that consists of the choices that represent the combinations that have both marks from each determined and-node found in step S150. After the context is determined in step S220, control continues to step S230 and the process ends.

To illustrate the exemplary systems and methods of this invention, consider a simple and-or tree that consists of two or-nodes: TRUE⇋oneof(P1, P2, ... Px) and TRUE⇋oneof (Q1, Q2, ..., Qy). To determine the conjunction of two contexts that each consists of choices drawn from one or both of these or-nodes, all of the choices in the first context are marked with a first mark and all of the choices in the second context are marked with a second mark. The first or-node is partitioned into four partitions.

The first partition "a1" contains choices with both marks. The second partition "a2" contains choices that just have the first mark. The third partition "a3" contains choices that just have the second mark. The fourth partition "a4" contains choices that have neither mark.

The second or-node is similarly partitioned into partitions "b1–b4". The first partition "b1" of the second node contains the choices with both marks. The second partition "b2" of the second node contains the choices with just the first mark. The third partition "b3" of the second node contains the choices with just the second mark. The fourth partition "b4" of the second node contains the choices with neither the first nor the second mark.

The cross-product of the partitions "a1–a4" and "b1–b4" are determined. The resultant cross-product combinations are partitioned based on the first and second marks. For instance, the combination of "a1" and "b1" is put into the first partition, because both "a1" and "b1" only contain choices that have both marks, and so the cross-product combination must also have both marks. Similarly, the combination of "a2" and "b3" is put in the first partition because although choices in the "a2" partition have contain the first mark and choices in the "b3" partition only have the second mark, the combination of "a2" and "b3" must have both marks.

Figure 13:
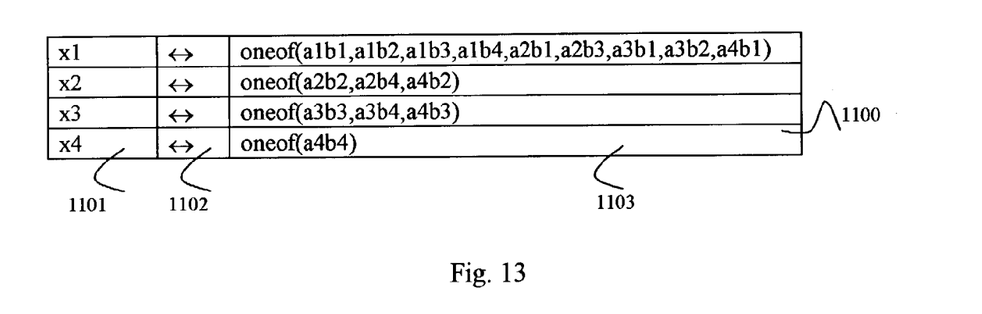
FIG. 13 an exemplary data structure for storing a partitioned cross product of combinations based on mark information according to this invention.

FIG. 13 shows the result of partitioning the cross-product. The X1 choice represents all the combinations that have both marks. The X2 choice represents all the combinations that only have the first mark. The X3 choice represents all of the combinations that only have the second mark. And the X4 choice represents the combination that has neither mark. The four choices make a new or-node that is in the TRUE context. The result of conjoining the two contexts is X1, a single choice that represents all possible combinations of both marks.

Thus, if the first context has M choices in it and the second context has N choices in it then the time taken to conjoin the two contexts using the systems and methods of this invention will be order O(M+N+16). In contrast, the conventional approach to conjoining two contexts is to take the cross-product of the choices which would result in order O(M*N) time. For large values of M and N, the exemplary embodiments according to this invention conjoin two contexts in order O(M+N+16) time which is much smaller than the conventional order O(M*N) time. Thus, conjunctions performed using the systems and methods of this invention take substantially less time than conventional approaches.

Figure 6:
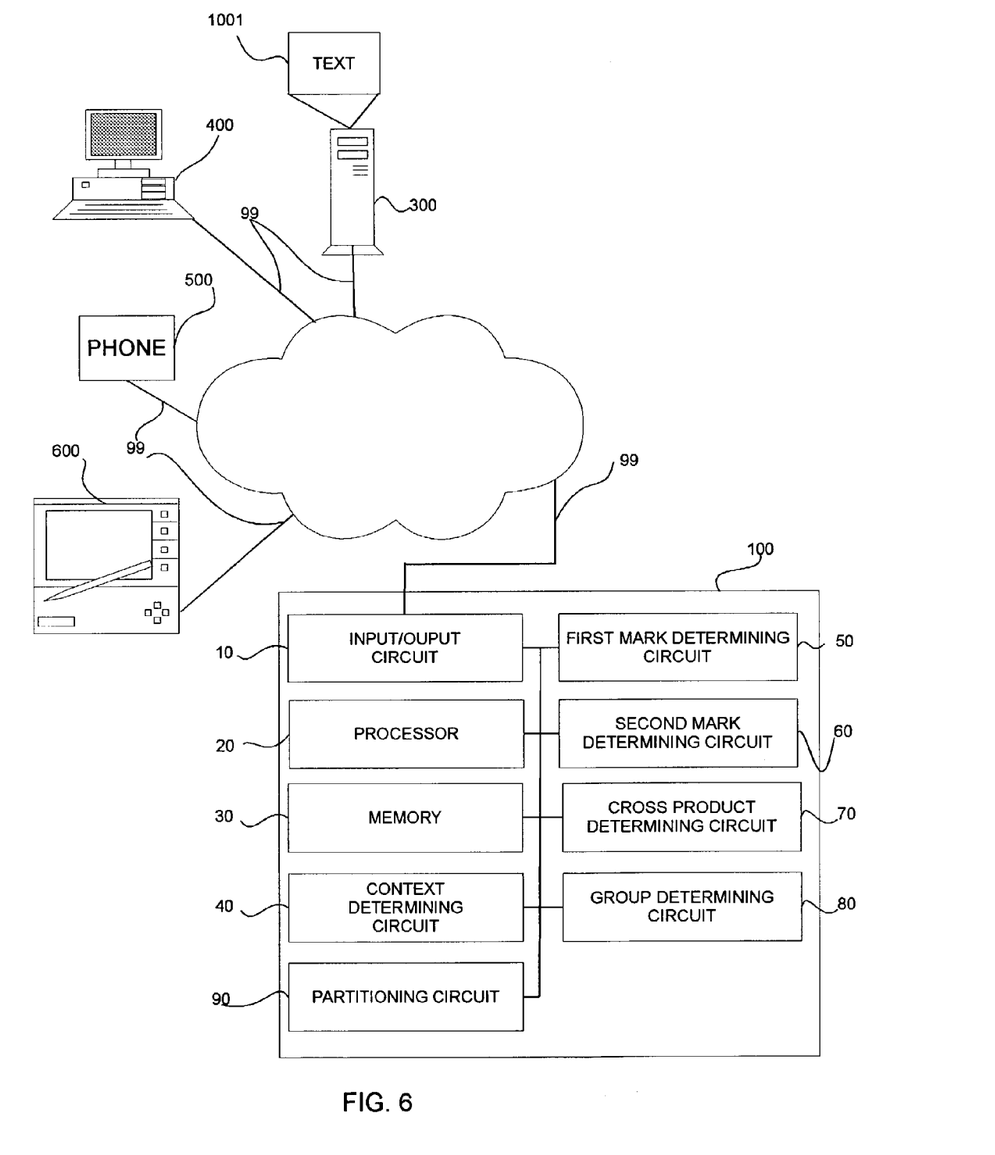
FIG. 6 is an exemplary Boolean conjunction manager according to this invention.

FIG. 6 is an exemplary Boolean conjunction manager according to this invention. The Boolean conjunction manager 100 comprises a processor 20, a memory 30, a context determining circuit 40, a first mark determining circuit 50, a second mark determining circuit 60, a cross product determining circuit 70, a group determining circuit 80 and a partitioning circuit 90, each connected to input/output circuit 10.

The Boolean conjunction manager 100 is in turn connectable to an information repository 300, a web-enabled personal computer 400, a phone 500 and a web-enabled portable device 600 via communications links 99. A user of web-enabled personal computer 600 initiates and forwards via communications links 99, a request for review of all mail related to "proxy fight for PDZ Corporation" contained in information repository 300.

In one of the various exemplary embodiments according to this invention, the information repository 300 determines a packed representation of the request for review of all mail related to "proxy fight for PDZ Corporation" and forwards the packed representation of the request to the Boolean conjunction manager 100 via communications links 99. The packed representation is received at the input/output circuit 10 of the Boolean conjunction manager 100. The processor 20 receives the packed representation and stores it in memory 30. The processor 20 activates the conjunction determination circuit 40 to determine a first context of a choice from a first node of the packed representation. The first mark determining circuit 50 is activated to associate a first mark with each choice in the first context.

The context determining circuit 40 is then activated to determine a second context for a second or-node in the packed representation. The second mark determining circuit 60 is activated to associate a second mark with each choice in the second context. It will be apparent that the terms, first and second marks, are used merely for discussion purposes and that the first and second marks can be determined in any order and-or simultaneously without departing from the scope of this invention.

An and-node in the and-or forest of choices is determined that has both the first and second marks based on two different dependent or-nodes. The processor 20 then refines the dependent or-nodes so that each choice is either always enabled or never enabled by the first context. The dependent or-node is split into two or-nodes with one dependent or-node having choices that are always enabled in the first context and the other dependent or-node having choices that are never enabled in the first context. The processor 20 then refines the dependent or-nodes so that each choice is either always enabled or never enabled by the second context. The dependent or-node is split into two or-nodes with one dependent or-node having choices that are always enabled in the second context and the other dependent or-node having choices that are never enabled in the second context. The current choice is then replaced with two new choices. The first new choice has the first or-node as a dependent and the second new choice has the second or-node as a dependent. The current choice is made a dependent of the two new choices.

The partitioning circuit 90 is activated to partition the or-node choices which depend from the determined and-node into classes based on the presence of both marks, only the first mark, only the second mark and neither mark.

The cross product determining circuit 70 is activated to determine the cross product of the partitions based on the presence of both marks, only the first mark, only the second mark and neither mark. The group determining circuit 80 is activated to group the resultant cross-product combinations based on the presence of both marks, only the first mark, only the second mark and neither mark. The processor 20 then determines a new or-node having choices X1–X4 based on the presence of both marks, only the first mark, only the second mark and neither mark.

The processor 20 replaces the or-nodes depending from the determined and-node with the new or-node having choices X1–X4. The processor 20 then determines a new conjoined context based on the X1 choice of the new or-node.

Figure 7:
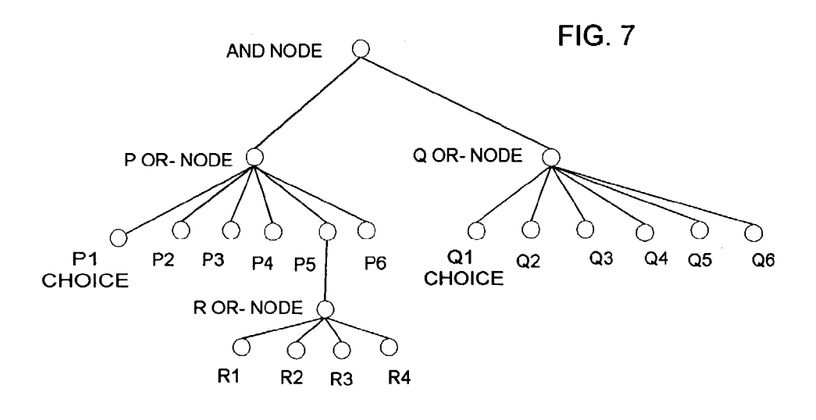
FIG. 7 is an exemplary forest of choices.

FIG. 7 is an exemplary forest of choices. The exemplary or-node forest of choices is comprised of the root and-node, P a first dependent or-node, Q a second dependent or-node, and R an or-node that is dependent on P5.

Figure 8:
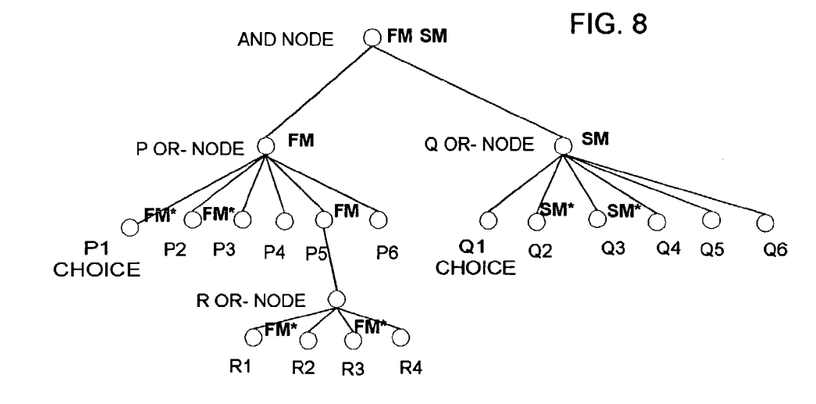
FIG. 8 is an exemplary forest of choices with a first and a second mark.

FIG. 8 is an exemplary forest of choices marked with a first mark (FM) and a second mark (SM). The choices that are always enabled by the first context are marked with a first mark and an asterisk (FM*). The choices that are always enabled by the second context are marked with a second mark and an asterisk (SM*). Note that the P5 choice is marked with a first mark but is not enabled by the first context since R2 and R4 are not marked with the first mark. In various exemplary embodiments of this invention, the mark and asterisk notation may be associated with a choice using a field, a hash array, an array or any known or later developed method of associating mark and asterisk information with a choice.

Figure 9:
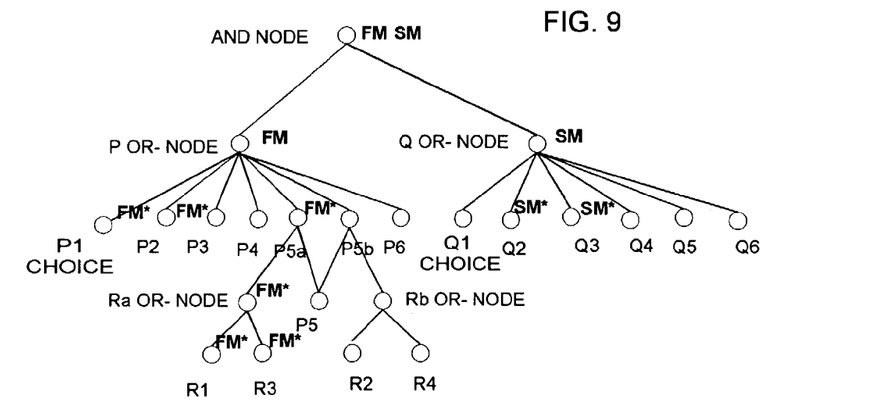
FIG. 9 is an exemplary forest of choices with refined nodes.

FIG. 9 is an exemplary forest of choices where the P or-node has been refined so that the choices are either always enabled by the first context or never enabled by the first context. For example, the P choices can be refined by splitting P5 into P5a and P5b. R is similarly split into Ra and Rb, where Ra only contains choices that are always enabled by the first context and Rb only contains choices that are never enabled by the first context. P5 is made dependent on both P5a and P5b in case there are external references to it. Thus, the exemplary forest of choices shown in FIG. 9 is logically equivalent to the forest of choices shown in FIG. 8.

Figure 10:
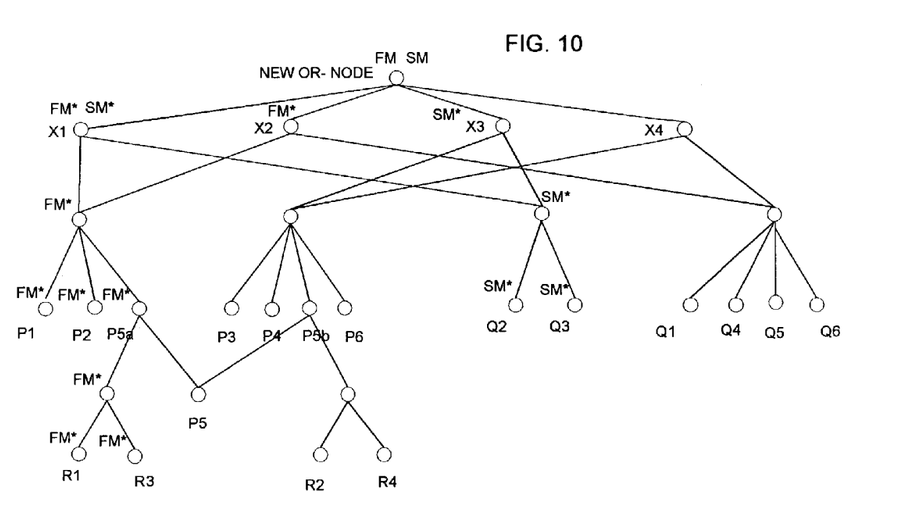
FIG. 10 is an exemplary forest of choices with a transformed forest of choices substituted for the P-node and the Q or-node.

FIG. 10 is an exemplary forest of choices with a transformed forest of choices substituted for the P and Q or-nodes. The transformed forest of choices is comprised of dependent nodes X1–X4. The X1 node is set up so that it is always enabled by the first context and the second context. The X2 node is set up so that it is always enabled by the first context but never enabled by the second context. The X3 node is set up so that it is always enabled by the second context but never enabled by the first context. Finally, the X4 node is set up so that it is never enabled by either context. FIG. 10 is logically equivalent to FIG. 9.

The description of FIG. 8 shows an exemplary forest of choices according to this invention. However, it will be apparent that in various other exemplary embodiments according to this invention, an or-node may have a mixture of choices, some of which have the first mark, some of which have the second, and some of which have both. It will also be apparent that the number of choices shown in FIG. 8 were selected to facilitate the description of the systems and methods of this invention and does not illustrate the performance advantages of this invention for larger numbers of choices. For example, more than five choices in the first and second contexts are generally required in order to exceed the efficiency of conventional approaches. For clarity of discussion, FIG. 8 shows only five choices in the first context and two choices in the second context. For this small number of choices, taking the cross-product might be more efficient. However, as the number of choices in the first and second contexts grows larger than five, the various embodiments of this invention become increasingly more efficient than the conventional cross-product method.

Figure 11:
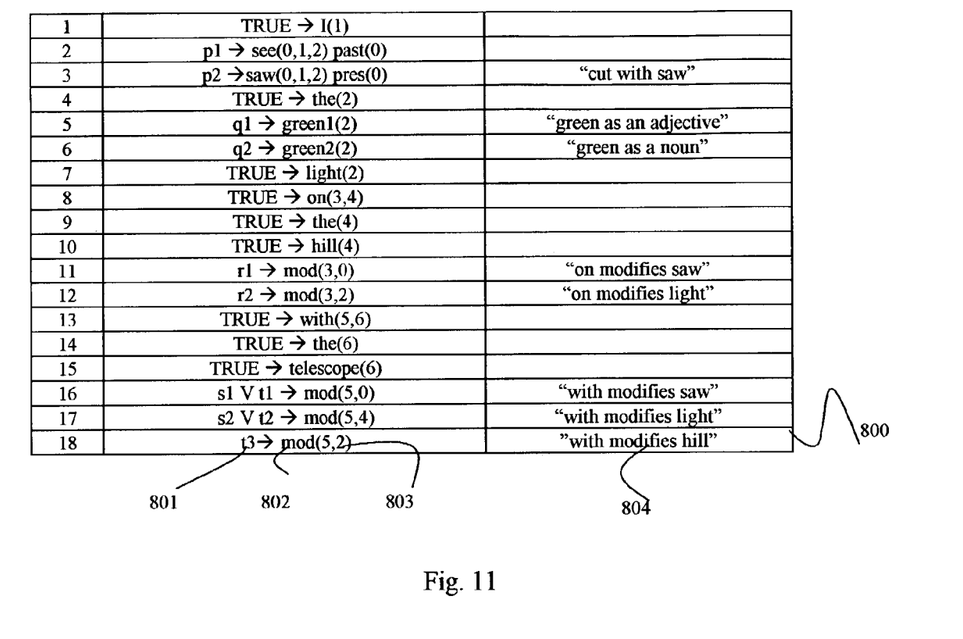
FIG. 11 is an exemplary data structure for storing the output of a linguistic environment.

FIG. 11 is an exemplary data structure for storing the output of a linguistic environment. The exemplary data structure for storing linguistic environment output 800 is comprised of a left hand or context portion 801 and a right hand side or meaning portion 803. The left hand or context portion 801 is related by operator portion 802 to the meaning portion 803. A comment portion 804 provides for comments on the context and meanings. For example, row 1 contains the fact having a TRUE context. That is, the value of the right hand side or meaning portion 803 is valid for all contexts.

The second row contains the value "P1" in the context portion 801 and a meaning portion 803 of "see(01,2,), past(0)". This indicates a choice of meaning for the word associated with the verb "to see" in the present tense. Similarly the third row contains a "P2" value in the context portion 801 and an associated meaning portion 803 of "saw(01,2,), pres(0)". This indicates a choice of meaning for the word associated with the verb "to saw" in the present tense. These two choices reflect one or-node within the representation of meaning associated with the sentence "I saw the green light on the hill with the telescope". The comment portion 804 of the exemplary output of a linguistic environment 800 contains comments clarifying the meanings.

Figure 12:
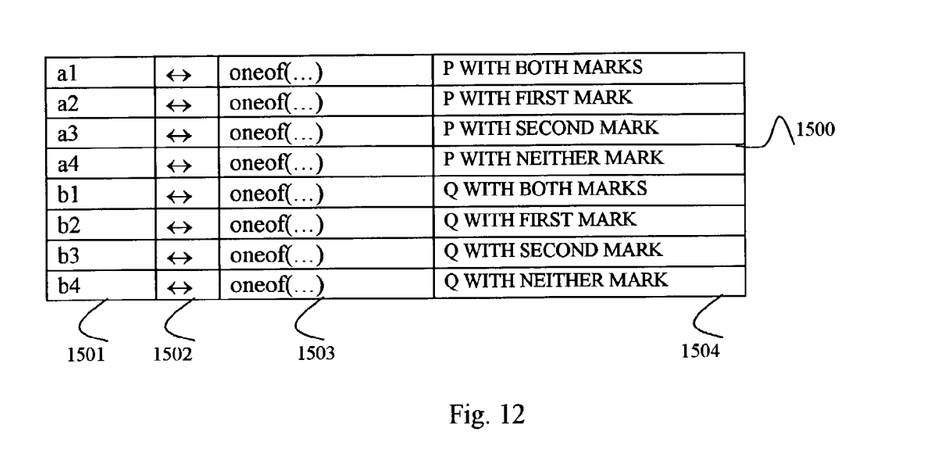
FIG. 12 is an exemplary data structure for storing mark information according to this invention.

FIG. 12 is an exemplary data structure for storing mark information according to this invention. The exemplary data structure for storing mark information 1500 is comprised of a node portion 1501, an operator portion 1502, a choice portion 1503 and a mark information portion 1504.

The first row of the data structure for storing mark information 1500 contains the value "a1" in the node portion 1501, an operator in the operator portion 1502 and a choice portion 1503 containing the partitioned nodes associated with the P context that contain both the first and second marks. For clarity not all values are shown. The mark information portion 1504 contains the indication of mark information for the associated nodes.

FIG. 13 an exemplary data structure for storing a partitioned cross-product of combinations based on mark information according to this invention. The exemplary data structure for storing the partitioned cross-product of combinations based on mark information 1100 is comprised of new node portion 1101, operator portion 1102 and choice portion 1103.

For example, the first row of the exemplary data structure for storing a grouping of nodes based on mark information 1100 contains the value "X1" in the new node portion 1101 and the value "oneof(a1b1, a1b2, a1b3, a1b4, a2b1, a2b3, a3b1, a3b2, a4b1)" in the choice portion 1103. This indicates that the combinations of choices contained in partitions a1b1, a1b2, a1b3, a1b4, a2b1, a2b3, a3b1, a3b2, and a4b1 must all have both first and second marks. Therefore each combination of choices is grouped under the X1 choice of the new or-node.

Similarly, the second row of the exemplary data structure for storing a grouping of nodes based on mark information 1100 contains the value "X2" in the new node portion 1101 and the value "oneof(a2b2, a2b4, a4b2)" in the choice portion 1103. This indicates that the combinations of choices contained in the partitions a2b2, a2b4, a4b2 must all have the first mark. Therefore each combination of choices is grouped under the X2 choice of the new or-node.

The third row of the exemplary data structure for storing a grouping of nodes based on mark information 1100 contains the value "X3" in the new node portion 1101 and the value "oneof(a3b3, a3b4, a4b3)" in the choice portion 1103. This indicates that the combinations of choices contained in the partitions a3b3, a3b4, a4b3 must all have the second mark. Therefore each combination of choices is grouped under the X3 choice of the new or-node.

The fourth of the exemplary data structure for storing a grouping of nodes based on mark information 1100 contains the value "X4" in the new node portion 1101 and the value "oneof(a4b4)" in the choice portion 1103. This indicates that the combinations of choices in the combined a4b4 partition contains neither the first mark nor the second mark.

Figure 14:
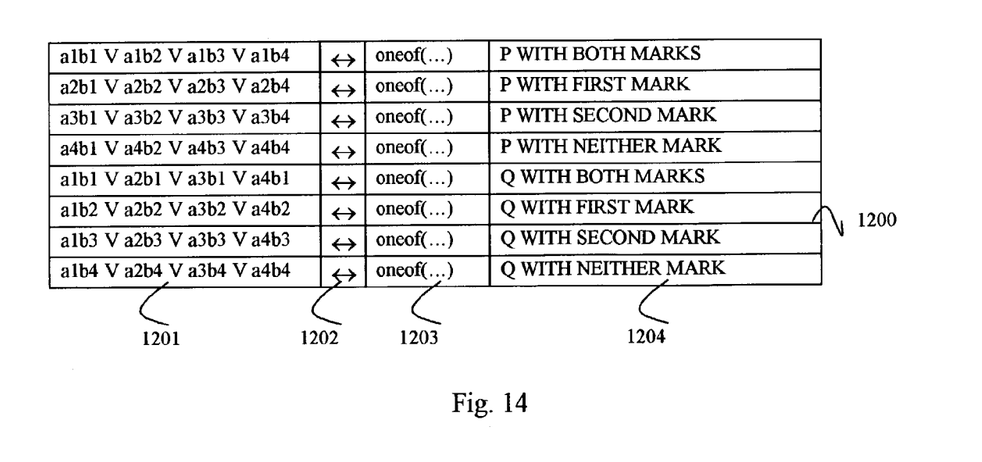
FIG. 14 an exemplary data structure for storing a transformed and-or forest of choices according to this invention.

FIG. 14 an exemplary data structure for storing a transformed and-or forest of choices according to this invention. The exemplary data structure for storing a transformed and-or forest of choices 1200 is comprised of a node portion 1201, an operator portion 1202, a choice portion 1203 and a mark information portion 1204. The node portion 1201 contains each of the nodes associated with a specific mark combination.

For example, the first row of the exemplary data structure for storing a transformed and-or forest of choices 1200 contains the nodes "a1b1 V a1b2 V a1b3 V a1b4" in the node portion 1201. The associated values in the choice portion 1203 of the exemplary data structure for storing a transformed and-or forest of choices 1200 are omitted for clarity. The mark information portion 1204 of the exemplary data structure for storing a transformed and-or forest of choices 1200 indicates that the nodes referenced in node portion 1201 are all associated with having both the first and second marks.

Figure 15:
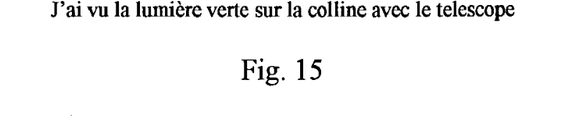
FIG. 15 is an exemplary French language translation of an English language sentence.

FIG. 15 is an exemplary French language translation of an English language sentence. The exemplary French language translation makes use of the context information provided by the systems and methods of this invention to translate "lumière verte" from the English green light.

Each of the circuits 10–20 and 40–80 of the Boolean conjunction manager 100 outlined above can be implemented as portions of a suitably programmed general-purpose computer. Alternatively, the circuits 10–20 and 40–80 of the Boolean conjunction manager 100 outlined above can be implemented as physically distinct hardware circuits within an ASIC, or using a FPGA, a PDL, a PLA or a PAL, or using discrete logic elements or discrete circuit elements. The particular form each of the circuits 10–20 and 40–95 of the Boolean conjunction manager 100 outlined above will take is a design choice and will be obvious and predictable to those skilled in the art.

Moreover, the Boolean conjunction manager 100 and-or each of the various circuits discussed above can each be implemented as software routines, managers or objects executing on a programmed general purpose computer, a special purpose computer, a microprocessor or the like. In this case, the Boolean conjunction manager 100 and-or each of the various circuits discussed above can each be implemented as one or more routines embedded in the communications network, as a resource residing on a server, or the like. The Boolean conjunction manager 100 and the various circuits discussed above can also be implemented by physically incorporating the Boolean conjunction manager 100 into a software and-or hardware system, such as the hardware and software systems of a computer or a client device.

As shown in FIG. 6, memory 30 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM EPROM, EEPROM, an optical ROM disk, such as a CD-ROM or DVD-ROM disk, and disk drive or the like.

The communication links 99 shown in FIGS. 1 and 6 can each be any known or later developed device or system for connecting a communication device to the Boolean conjunction manager 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. For example, the exemplary embodiment of this invention has been described with respect to the conjunction of two contexts for ease of discussion. However, it will be apparent that in various embodiments according to this invention, more that two contexts may be conjoined at the same time by conjoining the first two contexts and then repeatedly conjoining the result with each remaining context until none are left. In various other exemplary embodiments according to this invention, additional marks besides the first and second marks may be used for the additional contexts. Dependent or-nodes would then be partitioned into one class for each possible combination of marks along with other minor changes without departing from the scope of this invention. Accordingly, the exemplary embodiments of the invention, as set forth above, are intended to be illustrative, not limiting. Various changes may be made without departing from the spirit and scope of the invention.

What is claimed is:

1. A computer-implemented method of determining conjunctions of Boolean variables comprising the steps of:
   marking choices and associated antecedent choices of a first context in a forest of choices;
   marking choices and associated antecedent choices of a second context in a forest of choices;
   determining and-nodes in the forest of choices having a dependent or-node with a first mark and a different dependent or-node with a second mark;
   determining a partition of choices of the determined dependent or-nodes based on the first and second marks;
   determining a cross-product of the determined partitions;
   determining a grouping of the cross-product combinations based on the presence of the first and second marks;
   determining the choices in the cross-product that always have the first and second marks; and
   outputting the new forest of choices.

2. The method of claim 1, wherein the partition is based on presence of both the first and second marks, the first mark only, the second mark only and neither the first nor the second mark.

3. The method of claim 1, wherein the grouping is based on presence of both the first and second marks, the first mark only, the second mark only and neither the first nor the second mark.

4. The method of claim 2, wherein the grouping is based on presence of both the first and second marks, the first mark only, the second mark only and neither the first nor the second mark.

5. The method of claim 1, wherein mark information is stored in at least one of a list, a heap, a hash array and an array.

6. A computer-implemented method of determining information in a truth management system comprising the computer-implemented method of claim 1 and further comprising the step of determining logical combinations of choices for the first and second choices based on the choices in the cross-product and outputting the logical combinations.

7. The method of claim 6, wherein determining a logical choice for which the first choice and the second choice are always true based on the choice in the cross-product having both the first mark and the second mark.

8. The method of claim 6, wherein determining a logical choice for which the first choice is always true based on the choice in the cross-product having only a first mark.

9. The method of claim 6, wherein determining a logical choice for which the second choice is always true based on the choice in the cross-product having only a second mark.

10. The method of claim 6, wherein determining a logical choice for which the first and second choice are always false based on the choice in the cross-product having neither the first nor the second mark.

11. A system for determining conjunctions of Boolean variables comprising:
a processor that activates an input/output circuit to receive a forest of choices;
a context determining circuit that determines a first context for a first or-node and a second context for a second or-node;
a first mark determining circuit that marks all choices in the first context and all antecedent choices with a first mark;
a second mark determining circuit that marks all choices in the second context and all antecedent choices with a second mark; and wherein the processor determines and-nodes in the forest of choices having dependent or-nodes with a first mark and different dependent or-nodes with a second mark;
a partitioning circuit that determines partitions for each determined or-node based on the first and second mark;
a cross product determining circuit that determines a cross product of the determined partitions; and
a group determining circuit that groups the determined cross product based on the first and second marks;
an input/output circuit that outputs the new forest of choices.

12. The system of claim 11, wherein the partition is determined based on presence of both the first and second marks, the first mark only, the second mark only and neither the first nor the second mark.

13. The system of claim 12, wherein the grouping is determined based on presence of both the first and second marks, the first mark only, the second mark only and neither the first nor the second mark.

14. The system of claim 11, wherein the grouping is determined based on presence of both the first and second marks, the first mark only, the second mark only and neither the first nor the second mark.

15. The system of claim 11, wherein mark information is stored in a memory as at least one of a list, a heap, a hash array and an array.

16. Computer readable storage medium comprising: computer readable program code embodied on the computer readable storage medium, the computer readable program code usable to program a computer to determine conjunctions of Boolean variables comprising the steps of:
marking choices and associated antecedent choices of a first context in a forest of choices;
marking choices and associated antecedent choices of a second context in a forest of choices;
determining and-nodes in the forest of choices having a dependent or-node with a first mark and a different dependent or-node with a second mark;
determining a partition of choices of the determined dependent or-nodes based on the first and second marks;
determining a cross-product of the determined partitions;
determining a grouping of the cross-product combinations based on the presence of the first and second marks;
determining the choices in the cross-product that always have the first and second marks; and
outputting the new forest of choices.

17. Computer readable storage medium comprising: computer readable program code embodied on the computer readable storage medium, the computer readable program code usable to program a computer to determine conjunctions of Boolean variables comprising the steps of:
instructions for marking choices and associated antecedent choices of a first context in a forest of choices;
instructions for marking choices and associated antecedent choices of a second context in a forest of choices;
instructions for determining and-nodes in the forest of choices having a dependent or-node with a first mark and a different dependent or-node with a second mark;
instructions for determining a partition of choices of the determined dependent or-nodes based on the first and second marks;
instructions for determining a cross-product of the determined partitions;
instructions for determining a grouping of the cross-product combinations based on the presence of the first and second marks; and
instructions for determining the choices in the cross-product that always have the first and second marks; and
instructions for outputting the forest of choices.

18. A computer-implemented method of determining conjunctions of Boolean variables comprising the steps of:
marking choices and associated antecedent choices of a first context in a forest of choices;
marking choices and associated antecedent choices of a second context in a forest of choices;
determining and-nodes in the forest of choices having a dependent or-node with a first mark and a different dependent or-node with a second mark;
refining choices of or-nodes depending from the determined and-nodes to be one of, always enabled in a first context, never enabled in a first context;
refining choices of or-nodes depending from the determined and-nodes to be one of, always enabled in a first context, never enabled in a second context;
determining a partition of choices of the determined dependent or-nodes based on the first and second marks;
determining a cross-product of the determined partitions;
determining a grouping of the cross-product combinations based on the presence of the first and second marks;
determining the choices in the cross-product that always have the first and second marks; and
outputting the choices.

19. A system for determining conjunctions of Boolean variables comprising:
- a processor that activates an input/output circuit to receive a forest of choices;
- a context determining circuit that determines a first context for a first or-node and a second context for a second or-node;
- a first mark determining circuit that marks all choices in the first context and all antecedent choices with a first mark;
- a second mark determining circuit that marks all choices in the second context, and all antecedent choices with a second mark; and wherein the processor determines and-nodes in the forest of choices having dependent or-nodes with a first mark and different dependent or-nodes with a second mark and refines the choices of dependent or-nodes depending from the determined and-nodes to be one of, always enabled in a first context, never enabled in a first context; and refines the choices of or-nodes depending from the determined and-nodes to be one of, always enabled in a first context, never enabled in a second context;
- a partitioning circuit that determines partitions for each determined or-node based on the first and second mark;
- a cross product determining circuit that determines a cross product of the determined partitions; and
- a group determining circuit that groups the determined cross product based on the first and second marks and outputs the conjunction.

* * * * *